Dec. 23, 1947.  G. MESAROS  2,433,058
CIRCULAR CUTTING AND EJECTING DIE
Filed April 16, 1946
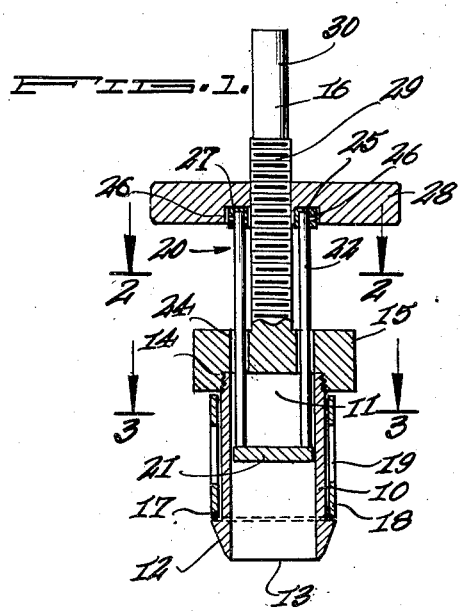
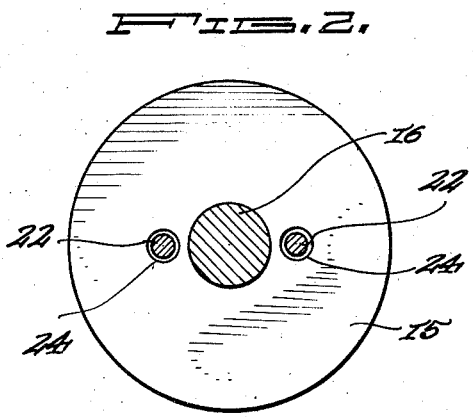
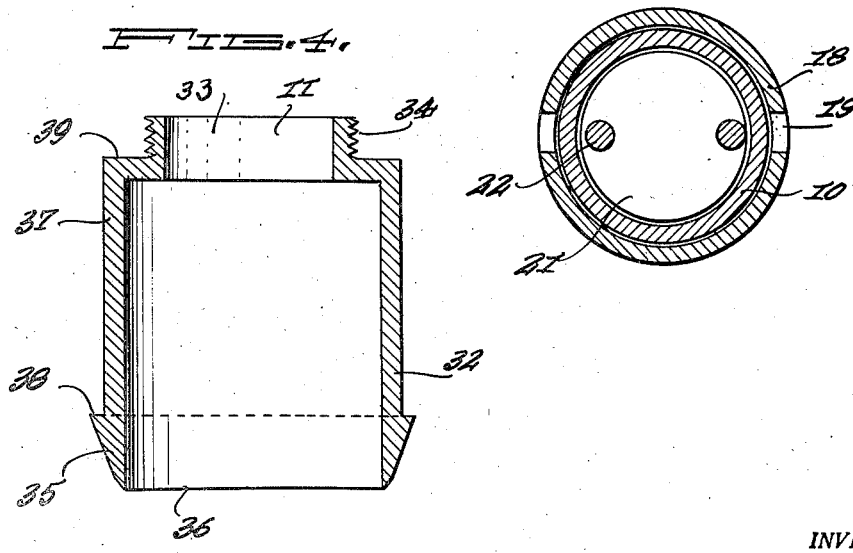
INVENTOR.
GEORGE MESAROS.
BY
Clark+Ott
ATTORNEYS.

Patented Dec. 23, 1947

2,433,058

UNITED STATES PATENT OFFICE 2,433,058

CIRCULAR CUTTING AND EJECTING DIE

George Mesaros, Linden, N. J.

Application April 16, 1946, Serial No. 662,521

1 Claim. (Cl. 164—33)

This invention has particular reference to a rotary cutting and ejecting die adapted for cutting relatively thick circular elements from sheet material and for ejecting the cut elements from the die without distortion thereof.

The invention has in view a circular cutting and ejecting die designed for rotary as well as reciprocatory movement for cutting the circular elements and for discharging the cut elements therefrom upon reciprocatory movement in opposite directions.

The invention further comprehends the provision of a collar having threaded engagement on the shank of the cutting die and which collar is adapted to be gripped by the hand of the operator for effecting movement of the ejector and a discharge of the cut elements upon retraction of the die.

The invention further embodies a cutting and ejecting die provided with a removable cutter element and adapted to receive various sizes thereof for cutting different sizes of circular elements.

The invention further comprehends a sleeve freely mounted on the die and adapted to engage the annular edge of the opening in the material produced by the cutting of the circular element therefrom so as to eliminate frictional engagement of the upper portion of the die therewith and which sleeve is apertured for permitting of lubrication of the confronting surfaces of the sleeve and die.

With the foregoing and other objects in view, reference is now made to the following specification and accompanying drawings in which the preferred embodiment of the invention is illustrated.

In the drawings:

Fig. 1 is a vertical sectional view through a cutting and ejecting die constructed in accordance with the invention.

Fig. 2 is an enlarged transverse sectional view taken approximately on line 2—2 of Fig. 1.

Fig. 3 is a similar view taken approximately on line 3—3 of Fig. 1.

Fig. 4 is a vertical sectional view of a modified form of cutter member.

Referring to the drawings by characters of reference, the device consists of an annular cutter member 10 having an open inner or upper end 11 and formed with a frusto-conical outer end portion 12 terminating in an annular cutting edge 13. The inner or upper end portion of the cutter member is exteriorly threaded and is removably secured in a threaded annular recess 14 in a head 15 formed at the lower end of an elongated shank 16. Inwardly of the frusto-conical portion 12 the cutter member 10 is reduced in diameter so as to define an annular shoulder 17 and between the shoulder 17 and the head 15 a sleeve 18 is disposed in surrounding relation with the cutter member and freely rotatable with reference thereto. The sleeve 18 is preferably formed of brass and the same is provided with longitudinally extending slots 19 to permit of lubricating the confronting faces of the cutter member and sleeve.

In order to discharge the circular elements from within the cutter member 10 as the same are cut from a sheet of material, an ejector 20 is provided which consists of a head 21 located within the cutter member and secured to the lower ends of rods 22 which extend upwardly through the inner end 11 of the cutter member and through apertures 24 in the head 15 of the shank 16 with the upper ends of the rods removably connected with an annular ring 25 by means of screws 26.

The ring 25 is adapted to slidably engage in an annular recess 27 in the lower face of a knurled collar 28 threadedly engaged on the threaded portion 29 of the shank 16. The rods 22 are slidable in the openings 24 in the head 15 so as to permit of reciprocatory movement of the ejector head 21 within the cutter member.

The upper end portion 30 of the shank 16 is adapted to be inserted in a drill press or other machine for imparting a rotary motion as well as reciprocatory movement to the shank 16 and cutter member 10 or a downward feeding of the cutter member 10 to effect a cutting by the cutting edge 13 of circular elements from a sheet of material disposed on the bed of the machine and an upward movement of the cutter 10 to effect an ejection of the cut element from within the cutter 10. The ejection of the cut elements is effected by the operator grasping the knurled collar 28 by the hand as the shank 16 together with the cutter 10 is moved upwardly and rotated in a clockwise direction to thereby cause the collar to move downwardly on the threaded portion 29 thereof and to force the ejector head 21 towards the cutting edge 13.

The cutter member 10 is removably associated with the head 15 whereby the cutter member 10 may be removed and various sizes of cutters secured to the head 15 so as to cut different sizes of circular elements. As illustrated in Fig. 4 of the drawings, a cutter element 32 of relatively larger size is provided having an open inner end 33 which is exteriorly threaded as at 34 for securement in the threaded annular recess 14 in the head 15. The cutter member 32 is similarly provided with a frusto-conical outer end portion 35 terminating in an annular cutting edge 36. The annular wall 37 thereof is reduced in thickness inwardly of the frusto-conical portion 35 so as to define a shoulder 38 similar to the previous form of the invention for receiving a sleeve in surrounding relation with the wall portion 37 of said cutter member between the shoulder 38 and the head 15 similar to the sleeve 18. In this form of the invention, however, the annular wall 37 is relatively larger in diameter than the cutter member 10 in the previous form of the invention and is connected with the open end 33 by means of an annular wall portion 39.

What is claimed is:

In a cutting and ejecting die, a head having a threaded annular recess in one face thereof and a shank of reduced diameter protruding from the opposite face in axial alignment with said recess, an annular cutter member having a cutting edge at one end thereof and threadedly engaged at its opposite end in the recess in said head, an ejector having a head mounted for reciprocatory movement in said cutter member, guide rods secured to said ejector head and extending through openings in said head in parallel relation with said shank, a ring secured to the upper end of said guide rods disposed in surrounding relation with said shank and a collar threadedly arranged on said shank and adapted to engage said ring for imparting outward movement to said ejector head upon outward rotary movement of the collar on said shank.

GEORGE MESAROS.

REFERENCES CITED

The following references are of record in the file of this patent:

UNITED STATES PATENTS

| Number | Name | Date |
| --- | --- | --- |
| 465,840 | Dewes et al. | Dec. 29, 1891 |
| 2,214,666 | Elf et al. | Sept. 10, 1940 |
| 2,351,435 | Kent | June 13, 1944 |

FOREIGN PATENTS

| Number | Country | Date |
| --- | --- | --- |
| 402,216 | Germany | Sept. 13, 1924 |